United States Patent [19]
Griot

[11] 3,855,296
[45] Dec. 17, 1974

[54] CYCLO-SUBSTITUTED-1-p-(ω-AMINOALKOXY) PHENYL CYCLOHEXANES

[75] Inventor: Rudolf G. Griot, Basel-Stadt, Switzerland

[73] Assignee: Sandoz-Wander, Inc., Hanover, N.J.

[22] Filed: Apr. 3, 1969

[21] Appl. No.: 813,324

Related U.S. Application Data

[63] Continuation-in-part of Ser. No. 725,198, April 29, 1968.

[52] U.S. Cl.... 260/570.7, 260/326.5 C, 260/465 D, 260/468 G, 260/468 K, 260/468 L, 260/473 IG, 260/501.18, 260/501.19, 260/544 M, 260/559 B, 260/586 R, 260/612 R, 260/619 F, 424/274, 424/316, 424/330

[51] Int. Cl............................................. C07c 93/06

[58] Field of Search ........ 260/570.7, 612, 520, 512, 260/501.18, 501.19

[56] References Cited
UNITED STATES PATENTS

3,415,873   12/1968   Stevens.................. 260/570.7 X
3,234,211   2/1966   Huebner et al............. 260/570.7 X

OTHER PUBLICATIONS

Bencze, "Chemical Abstracts," Vol. 60, page 15779–15780, (1964).

Primary Examiner—Robert V. Hines
Attorney, Agent, or Firm—Gerald D. Sharkin; Richard E. Vila

[57]   ABSTRACT

This invention relates to cyclo-substituted-1-p-(ω-aminoalkoxy) phenyl cyclohexanes useful as hypolipidemics and to preparation thereof, e.g., by hydrogenation of corresponding substituted p-(ω-aminoalkoxy) phenyl-2-cyclohexen-1-ols, p-(ω-aminoalkoxy)phenyl-cyclohexenes or p-(ω-aminoalkoxy)phenyl-cyclohexen-dienes; or from other key intermediates which are, for example, 1-(p-hydroxyphenyl)-3-phenylcyclohexanes, and 2-(m-terphenyl-4-yloxy)lower aliphatic monocarbocylic acids.

8 Claims, No Drawings

CYCLO-SUBSTITUTED-1-p(ω-AMINOALKOXY) PHENYL CYCLOHEXANES

This application is a continuation-in-part of my prior copending application Ser. No. 725,198, filed Apr. 29, 1968.

The present invention relates to cyclo substituted-1-p-(ω-aminoalkoxy)phenyl cyclohexanes and methods of preparing the same.

The p-(ω-aminoalkoxy)phenyl substituted cyclohexanes of the present invention are from the group of:

A. compounds represented by the following structural formula I:

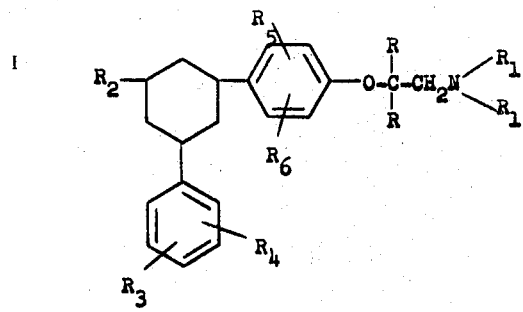

wherein each of
R is, independently, hydrogen or lower alkyl of one to four carbon atoms;
each of
$R_1$ is, independently, lower alkyl of one to four carbon atoms or both $R_1$ together an alkylene bridge of four to five carbon atoms, e.g., both $R_1$ together with the amino nitrogen form a N-pyrrolidyl substituent;
$R_2$ is hydrogen, phenyl or substituted phenyl of the formula:

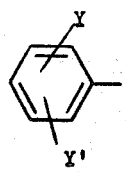

each of
Y, Y', $R_3$ and $R_4$ is, independently, hydrogen, halo of atomic weight not exceeding 80, lower alkyl of one to four carbon atoms, lower alkoxy of one to four carbon atoms or phenyl, provided $R_3$ and $R_4$ are hydrogen when $R_2$ is hydrogen and provided $R_3$, $R_4$, Y and Y' together represent no more than one phenyl and providing that $R_3$, $R_4$, Y and Y' together represent no more than a total of two alkyl and alkoxy substituents, and
each of
$R_5$ and $R_6$ is, independently, hydrogen or lower alkyl of one to four carbon atoms;
B. N-oxides of the compounds of formula I; and
C. the pharmaceutically acceptable acid addition salts of A) and B), above.

The generally preferred method of preparation of the compounds of the invention involves catalytic hydrogenation of any one or more of a class of several compounds which includes, for example, the corresponding p-(ω-aminoalkoxy)phenyl-cyclohexanes, p-(ω-aminoalkoxy)phenyl-cyclohexendienes and p-(ω-aminoakoxy)-cyclohexen-ols, and representative compounds of said class and their use in preparing the compounds of the invention by catalytic hydrogenation generally referred to herein as the Step A reaction is illustrated below, as follows:

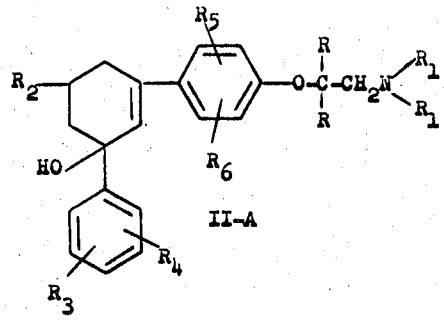

II-A

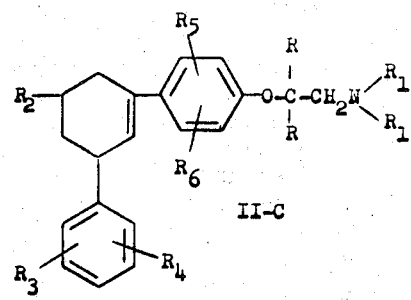

II-C

Step A

Step A

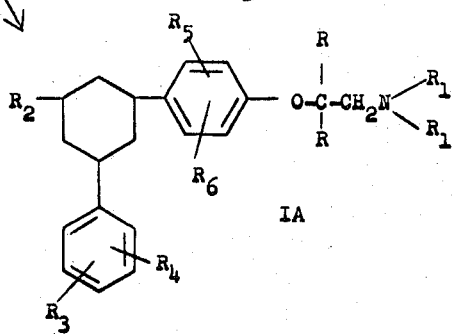

IA

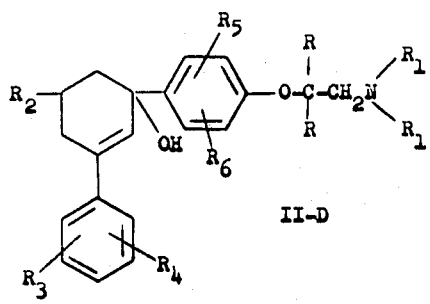

II-D

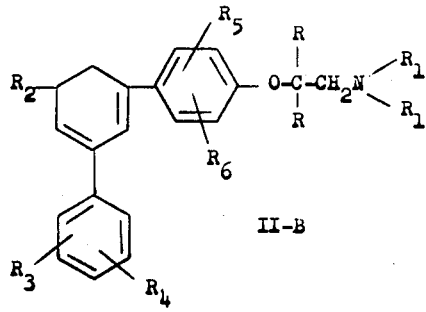

II-B

In the above illustrated reactions the Compound IA represented the compounds I of the invention excluding the N-oxides thereof.

The reaction of Step A to produce compound IA from compounds generally identified as compounds II and represented by compounds II-A through II-D, inclusive, involves a catalytic hydrogenation which may be carried out over a fairly wide temperature range typically from 10° to 100°C., preferably between 20° to 80°C. The hydrogenation may be carried out at atmospheric pressure or at superatmospheric pressure, and usually in the range between atmospheric pressure up to 2,000 p.s.i. The hydrogenation is conducted preferably with an approximately required stoichiometric amount of elemental hydrogen and in the presence of inert organic solvent and hydrogenation catalyst of which several are known and available, such as platinum supported on carbon or palladium on carbon. The especially preferred catalyst is palladium supported on carbon, e.g., a catalyst of a minor portion of 3–10 percent palladium on 90–97 percent charcoal. Such charcoal supported palladium catalysts are of a well-known type. The especially preferred solvent for use with palladium-carbon catalyst is acetic acid. Compounds IA are conveniently recovered in the form of an acid addition salt, preferably the hydrochloride, and, if desired, may be converted to the free base by conventional procedures.

Another preferred process for preparation of the compounds IA of the invention referred to herein as Step A-1 involves reacting a 1-(p-hydroxyphenyl)-3-phenylcyclohexane or alkali metal salt thereof of the formula II':

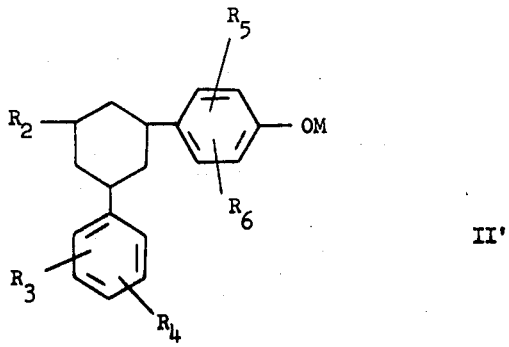

II' wherein
R$_2$, R$_3$, R$_4$, R$_5$ and R$_6$ are as defined and M is H or alkali metal, preferably sodium or potassium, with a compound III which is an alpha halo derivative of or forming the desired ω-aminoalkoxy moiety and having the formula:

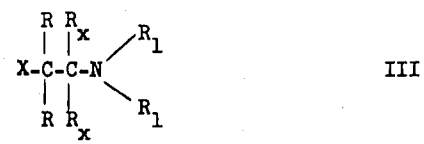

III wherein
R and R$_1$ are as defined, X is halo of atomic weight of from 35 to 127 and both R$_x$ are both hydrogen or lower alkyl but when lower alkyl both R are hydrogen, whereby compounds of formula IA of the invention are obtained.

The production of compound IA by the reaction of Step A-1 involves a synthesis of the well-known Williamson type and is conveniently carried out by reacting compounds II' and III at elevated temperatures suitably in the range of 30° to 150°C. Reflux temperatures are preferably employed and reaction times typically involve a period of from 5 to 40 hours. The reaction is preferably carried out in the presence of an inert organic solvent for the starting materials and product. Examples of such solvents include toluene, dimethylacetamide, dimethylformamide and dimethylsulfoxide, preferably toluene or the solvent in which the alkali metal salt is prepared from the corresponding p-hydroxyphenyl compound. It will be noted that R$_x$ in compound III can be lower alkyl, i.e., the lower alkyl substituent is on the omega carbon atom, because such compounds III are capable of undergoing rearrangement on reaction with compounds II' to form compounds such as compounds IA in which the alpha carbon substituent R is lower alkyl, as described by J. F. Kerwin et al., J.A.C.S. 69, 2961 (1947). It will be of course evident that when M is hydrogen in compound II' such compound is converted for reaction in Step A-1 to the alkali metal salt in a known manner.

Another preferred process for preparation of the compounds IA of the invention referred to herein as reaction Step A-2 involves subjecting a compound of the formula IV:

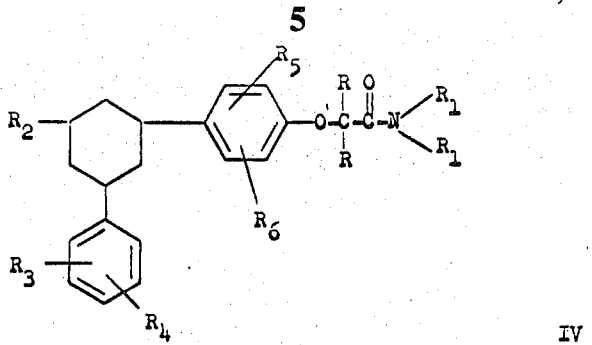

IV wherein R, $R_1$, $R_2$, $R_3$, $R_4$, $R_5$ and $R_6$ are as defined, to reduction in a known manner to obtain said compounds of formula IA.

The reaction of Step A-2 is a conventional reduction preferably carried out employing lithium aluminum hydride as reducing agent. Reaction temperatures may be suitably in the range of 20° to 150°C. The reaction is carried out in an inert organic solvent of known suitability for such reactions, for example, the ethers such as tetrahydrofuran. The reaction product of formula IA may be isolated by working up by established procedures.

The compounds of formula IV may be obtained by one or more procedures starting from the important intermediate compound of formula II″:

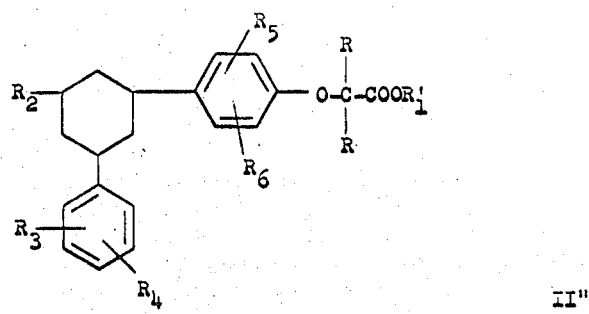

II″ wherein R, $R_2$, $R_3$, $R_4$, $R_5$ and $R_6$ are as defined, and $R_1'$ varies depending upon the particular procedure employed. For example, when $R_1'$ is hydrogen, the resulting compound II′ may be subjected in a Step A-2II″1 to reaction in a known manner to obtain the corresponding acid halide which is then subjected in a Step A-2-2 to reaction in a known manner with an amine of the formula V:

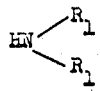 V wherein $R_1$ is as defined, to obtain a compound of the formula IV.

The reaction Step A-2-1 is a conventional reaction carried out to obtain the acid halide of compound II″ for reaction in Step A-2-2 to obtain the compound IV. The reaction of Step A-2-1 is suitably carried out employing thionyl chloride and in excess thionyl chloride or in a solvent medium, preferably in an inert solvent of conventional type. The Step A-2-1 reaction may be suitably carried out at temperatures in the range of from 20° to 150°C., and the acid halide product need not be recovered as such for subsequent use in Step A-2-2.

The reaction of Step A-2-2 is a conventional reaction which may be carried out in an inert organic solvent or in an excess of the amine compound V if a liquid under the reaction conditions. Reaction temperatures may range from 0° to 100°C. and the product compound IV may be isolated by working up by conventional procedures.

Alternatively, the compounds II″ which are esters, i.e., in which $R_1'$ is other than hydrogen and said $R_1'$ is a good leaving group which is not sterically hindered, e.g., $R_1'$ is lower alkyl, p-nitrophenyl, cyanomethyl and the like, may be reacted a Step A-2-3 with an amine of formula V in the presence of a basic catalyst such as an alkali metal alkoxide, e.g., sodium methoxide to obtain directly a compound IV as product. Such reaction is preferably carried out at elevated temperatures and under pressure in an inert solvent medium which may be provided by employing an excess of the amine of formula V or by an inert organic solvent of conventional type, e.g., a lower alkanol such as ethanol. Reaction temperatures are preferably in the range of 100° to 180°C. and the product of formula IV may be isolated from the reaction by conventional procedures.

The N-oxide compounds of the invention are preferably produced in a known manner from compounds IA of the invention, for example, by reaction of compounds IA with a suitable oxidizing agent to obtain the N-oxides of the formula IB:

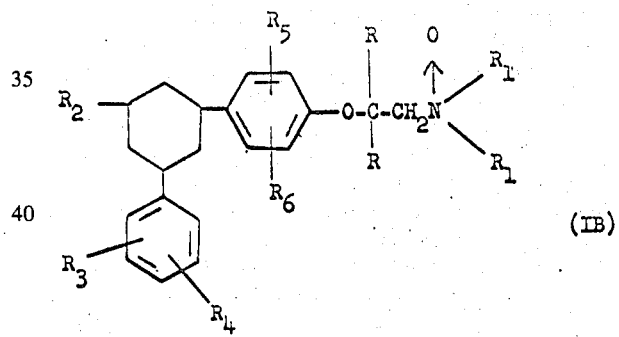

(IB)

wherein
R, $R_1$, $R_2$, $R_3$, $R_4$, $R_5$ and $R_6$ are as previously defined.

The production of the N-oxide compounds IB as above summarized may be carried out by the established procedures involving reaction of compound IAa with peracid, e.g., perbenzoic acid, m-chloroperbenzoic acid or peracetic with or without a solvent, e.g., chloroform, as may be desired or required depending respectively upon the selection of liquid or solid oxidizing agents, at temperatures between room temperature up to about 90°C. The production of the N-oxides is preferably carried out with a peroxide by established procedures, for example, by reaction of a compound IA with hydrogen peroxide in a suitable solvent at temperatures between room temperature up to about 90°C. Examples of preferred organic solvents typically employed include ethanol, acetic acid and acetic anhydride. The N-oxide may be isolated for the reaction mixture by working up by established procedures.

A preferred process for preparation of intermediate compounds II-A is summarized below, as follows:

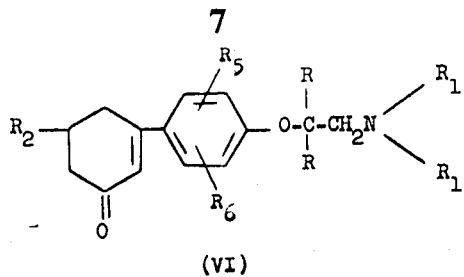

(VI)

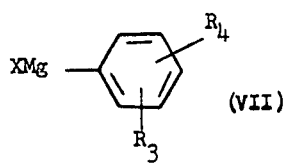

(VII)

pounds VI with the well-known Grignard compound VII to produce compound II-A is carried out in a conventional manner in the presence of an inert organic solvent and preferably at temperatures between about −10° to +80°C., followed by hydrolysis in the conventional manner, i.e., in a neutral medium such as water or saturated ammonium chloride solution. Preferred solvents are those customarily employed in Grignard reactions, including, by way of illustration, tetrahydrofuran, dioxane and the ethers such as diethyl ether, more preferably tetrahydrofuran.

The intermediate compound of formula VI may be produced starting from available and/or known materials by any of the several preferential reaction sequences. One such preferred method for production of compound VI may be carried out as illustrated below in which R, $R_1$, $R_5$, $R_6$, $R_x$, X and M have the above-defined meaning, $R_2'$ is the same as $R_2$ excluding hydrogen and R' represents lower alkyl.

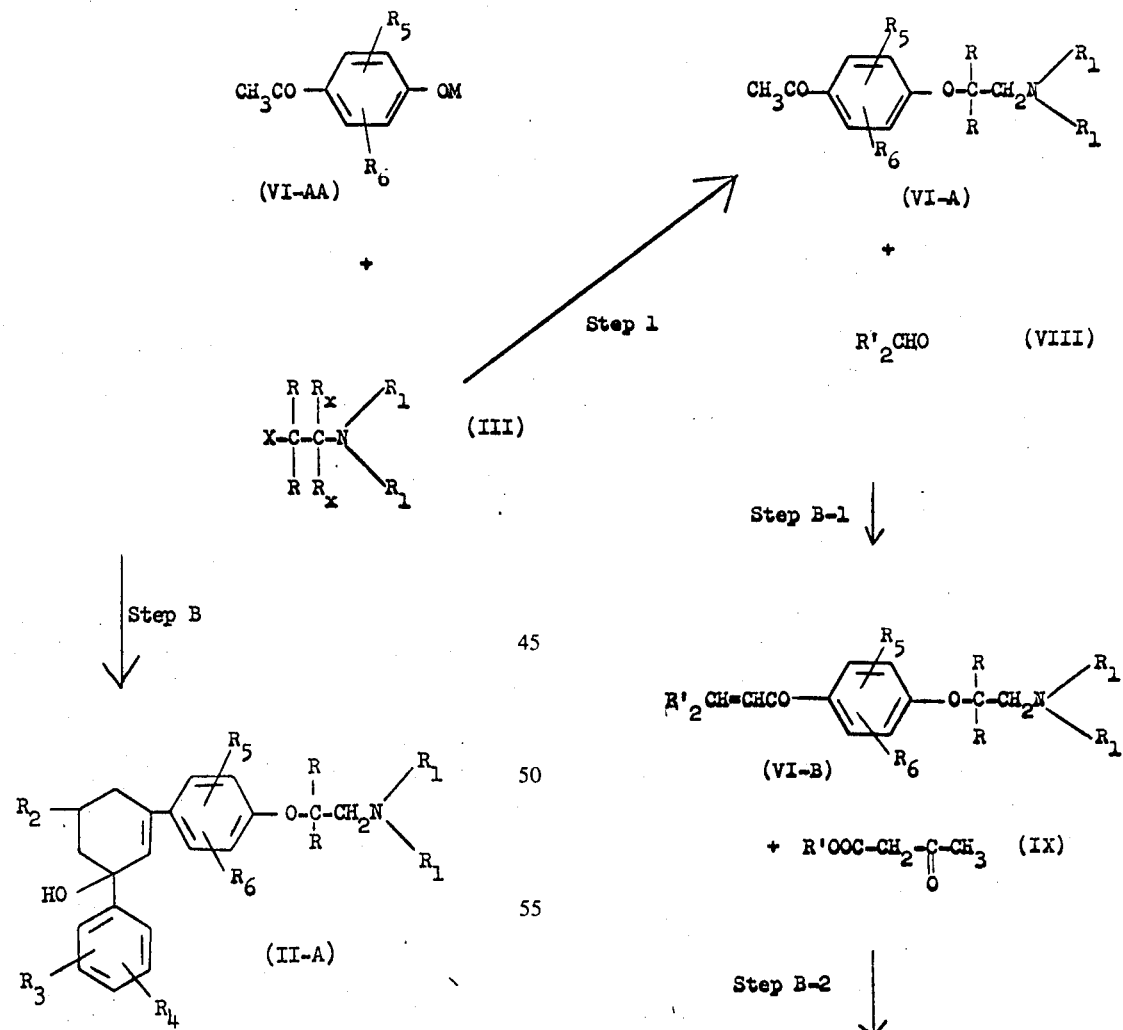

wherein R, $R_1$, $R_2$, $R_3$, $R_4$, $R_5$ and $R_6$ are as previously defined and X is halo of atomic weight of from 35 to 127, i.e., chloro bromo, or iodo, As illustrated above, compound II-A may be produced by the reaction Step B involving reaction of compounds VI which is a 3-p-(ω-aminoalkoxy)phenyl-2-cyclohexen-1-one, with an appropriate Grignard compound VII. The reaction of Step B involving com- Step B-3 ↓ Decarboxylate

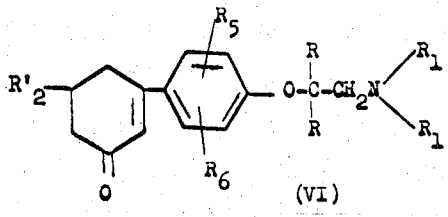

The compound VI-A which is a 4-(ω-aminoethoxy)-acetophenone is prepared by Step 1 involving reaction of a compound III with a compound VI-AA which is an alkali metal salt of the known class of compounds which are p-hydroxyacetophenones. The reaction of Step 1 is analogous to Step A-1. Compounds VI-A are also known or can be readily produced by established procedures, for example, production by reaction of Step 1 involving compounds III in which $R_x$ is hydrogen is described in British Patent 377,464 and in Chemical Abstracts, 1933, 4031. Compounds VI-A are similarly produced from compounds III in which $R_x$ is lower alkyl.

The production of compound VI-B by reaction of compound VI-A and a benzaldehyde (compound VIII) in Step B-1 involves a condensation of the known Claisen reaction type analogous, for example, to typical procedures for preparation of well-known compounds such as chalcone. The reaction of Step B-1 is carried out in the presence of a base preferably at temperatures between 0° to 40°C., more preferably 15° to 25°C., and in a suitable inert organic solvent for reactants and product. Illustrative of suitable bases are the alkali metal hydroxides, preferably sodium hydroxide. The preferred solvents are the alcohols such as ethanol. The product compound VI-B is usually recovered in the form of the acid addition salt, e.g., the hydrochloride, and may be converted to the free base by conventional procedures.

The production of compound VI-C by Step B-2 involving reaction of compound VI-B and compound IX is conducted under substantially anhydrous conditions in the presence of a base, preferably an alkali metal carbonate such as potassium carbonate, and in an inert organic solvent such as a lower alkanol, preferably ethanol. The reaction may be carried out at temperatures between 0° to 90°C., although it is usually desirable to regulate reaction temperatures in a preferred range between 15°C. and not have above 60°C., during a substantial period after commencement of the reaction. Reaction time is usually lengthy involving typically at least several hours or a matter of days, more usually a period between 12 hours to 3 days. Compounds IX are known or readily produced from available materials by known procedures. The especially preferred compound IX is ethyl acetoacetate.

Compound VI is produced in Step B-3 by decarboxylation of compound VI-C. The decarboxylation may be of a generally conventional type and carried out, for example, by subjecting compound VI-C to heating at elevated temperatures in the presence of a suitable decarboxylating reagent, preferably a strong base such as an alkali metal or alkaline earth metal hydroxide, more preferably sodium hydroxide. The decarboxylation as preferably conducted in an organic solvent at reflux temperatures usually involves several hours time.

Compound VI are also produced by alternate routes also involving preferred reaction schemes as illustrated by the reaction sequence immediately below in which R, $R_1$, $R_2'$, $R_5$, and R' have the previously defined meaning, and $R_2''$ is the same as $R_2'$ but excluding Y and Y' being alkoxy.

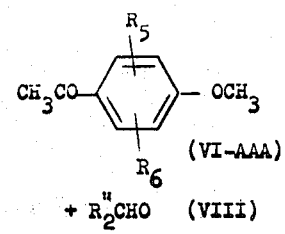

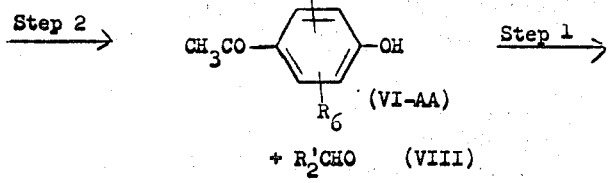

Step BBB-1 ↓     Step BB-1 ↓

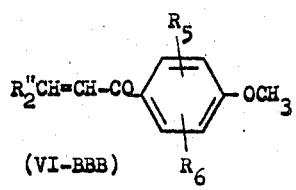

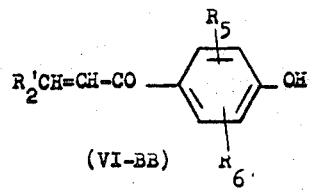

Step BBB-2 ↓     Step BB-2 ↓

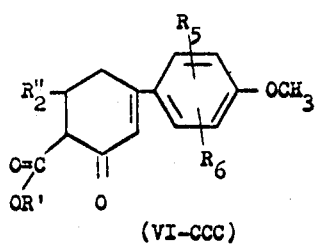
(VI-CCC)

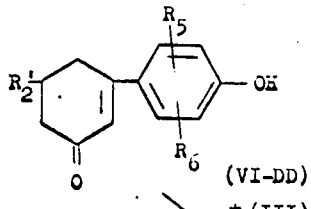
(VI-CC)

Step BBB-3 ↓

Step BB-3 ↓

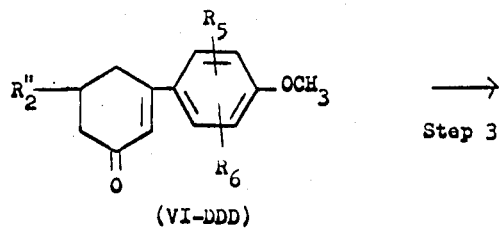

(VI-DDD)     Step 3 ⟶     (VI-DD) + (III)

Step B-4

The starting compound VI-AAA for the reaction Step BBB-1 in the step BBB reaction series is a p-methoxyacetophenone which is a known or readily prepared material. Compound VI-AAA can be readily converted by well-known procedures in a Step 2 to previously indicated compound VI-AA which is the starting material for the reactions of the Step BB series.

The reaction of Step BBB-1 is readily carried out analogously to the previously described Step B-1. Compounds VI-BBB are of a well-known class as is their preparation by the reaction of Step BBB-1.

Similarly, the reaction of Step BBB-2 is readily carried out analogously to Step B-2. Preferred reaction temperatures for Step BBB-2 involve regulation within the range of 15° to 40°C.

The reaction of Step BBB-3 to produce compound VI-DDD is readily carried out analogously to Step B-3.

Compound VI-DDD may be converted to compound VI-DD in Step 3 by conventional procedures. The preferred method of Step 3 involves reaction of compound VI-DDD with a metallic chloride of a known suitable type, preferably aluminum chloride. The reaction is preferably carried out at reflux temperature in the presence of an appropriate organic solvent of which xylene is a preferred example. Reaction times vary typically between about 1 to 10 hours with the reaction mixture preferably cooled to below room temperature and combined with a cold aqueous system prior to recovery by conventional procedures.

Compound VI-DD is converted to the intermediate compound VI by Step B-4 involving reaction of the alkali metal salt of compound VI-DD with compound III. Step B-4 is readily carried out analogously to previously described Step 1.

Compound VI-DD may also be produced by the step BB reaction sequence involving the individual Steps BB-1, BB-2 and BB-3. In said reaction sequence Step BB-1 is carried out analogously to previously described Step B-1, Step BB-2 is carried out analogously to Step B-2 and Step BB-3 is analogous to Step B-3.

Production of a compound VI by the preferred reaction sequence involving the Step BBB series reactions followed by Steps 3 and B-4 is exemplified hereinafter in Examples 1 – 4 beginning with well known compound VI-BBB.

A preferred method of preparation of the compounds of formula II-C involves in a first Step C-1 the reaction of a compound of formula X:

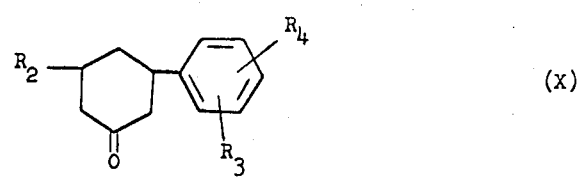

wherein
$R_2$, $R_3$ and $R_4$ are as defined, with a p-($\omega$-aminoethoxy)-phenyl magnesium halide of formula XI:

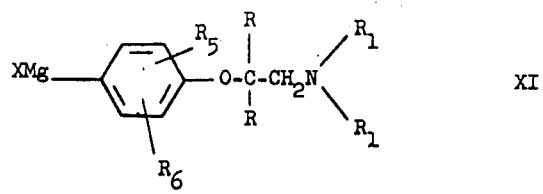

wherein R, $R_1$, $R_5$, $R_6$ and X are as defined, followed by hydrolysis in a conventional manner to obtain the compound of formula XII:

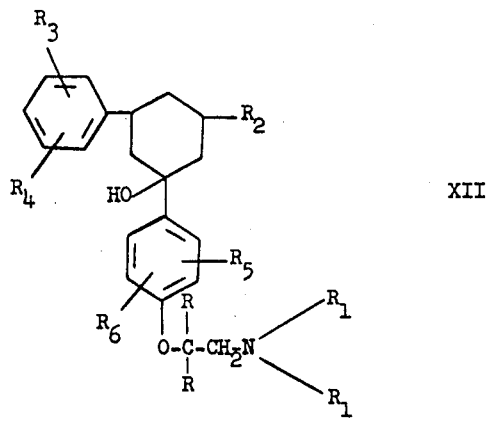

wherein R, $R_1$, $R_2$, $R_3$, $R_4$, $R_5$ and $R_6$ are as defined, said compound XII then being subjected in a Step C-2 to acid dehydration to obtain the corresponding compound of formula II-C.

The preparation of compound XII by Step C-1 involves the reaction of a 3-phenyl-cyclohexane-1-one of formula X with the Grignard compound of formula X which is a p-(ω-aminoethoxy)phenyl-magnesium halide. The reaction of Step C-1 may be suitably carried out similarly to the reaction of Step B, above-described. The starting compounds of formulae X and XI are either known or may be prepared from known materials by established procedures.

The preparation of compounds II-C by Step C-2 involves a dehydration of compound XII which may be carried out in a conventional manner in an organic solvent at temperatures in the range of 20° to 150°C., preferably 30° to 80°C. Suitably solvents are of conventional type which provide an inert medium, e.g., the alcohols such as ethanol. The preferred acid dehydration agents are the strong inorganic acids such as the hydrogen halides, more preferably hydrogen chloride. The product compound II-C may be recovered from the reaction mixture of Step C-2 by working up by established procedures.

A preferred method of preparation of the compounds of formula II-D involves in a Step D the reaction of a compound of the formula XIII:

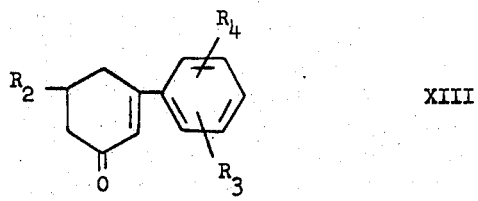

wherein $R_2$, $R_3$ and $R_4$ are as defined, with a Grignard compound of formula XI as defined above, to obtain a compound of formula II-D:

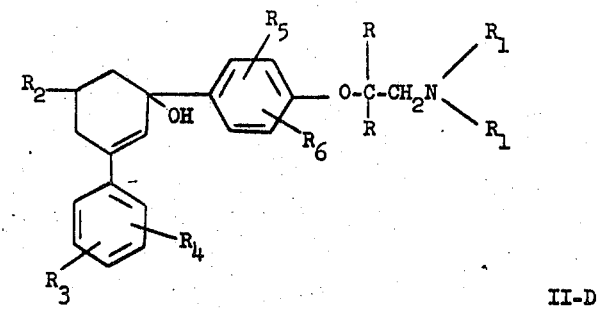

wherein R, $R_1$, $R_2$, $R_3$, $R_4$, $R_5$ and $R_6$ are as defined.

The preparation of compound II-D by Step D may be carried out analogously to the previously described reaction of Step C-1. The compounds XIII employed as starting material in Step D are either known or can be prepared from known material by established procedures.

It will be evident that various other procedures may occur to those skilled in the art for preparing compounds represented by the general formulae II. It will also be evident that certain compounds represented by the formulae II may be employed to obtain other of such compounds. For example, compounds II-A may be subjected to dehydration by procedures known per se to obtain the cyclohexen-dienes of formula II-B. In general, while certain preferred compounds of the formula II have been specifically described for the preparation of compound IA by Step A, it will be noted that my invention encompasses the preparation of compound IA from other compounds as represented by the general formulae II so long as the ring in the compound II forming the cyclohexyl moiety in compound I is a ring which is not fully unsaturated, i.e., not a phenyl ring, and thus will undergo catalytic hydrogenation removing from said ring of a compound II one or two double bonds and/or a hydroxy group pendent from said ring at a biphenyl position thereof, i.e., the 1-, 3-, or 5-position thereof at which one of the pendent phenyl groups or moieties is attached to the cyclohexyl ring of compounds I. For example, a compound of the formula XII may be isolated from its reaction mixture and subjected to hydrogenation to obtain a compound of formula IA. It will also be noted that other compounds II not otherwise specifically described herein may be analogously obtained, for example, by replacing the 4'-chalcone compounds VI-B, VI-BB and VI-BBB by the corresponding 4-chalcones which may be obtained by reacting an appropriately substituted or unsubstituted acetophenone with an appropriately substituted or unsubstituted 4-benzaldehyde analogously to Steps B-1, BB-1 and BBB-1 respectively, followed by converting said 4-chalcones by the remainder of the Step B, BB or BBB reaction sequences to obtain by reaction analogous to Steps B-3 or B-4 a 5-[4-(ω-aminoalkoxy)phenyl]-3-phenyl-2-cyclohexen-1-one which may be then converted analogously to Step B to obtain another intermediate compound II useful in the practive of the invention.

The important intermediate compounds of formula II' are new compounds which may be produced starting from known and/or available materials by one or more reaction sequences including sequences of which the first parts thereof have already been described with respect to preparation of intermediate compound VI. The latter sequences may be continued to produce compounds II' as illustrated immediately below in which R, $R_1$, $R_2'$, $R_3$, $R_4$, $R_5$ and $R_6$ have the meaning previously assigned and $R_3'$ and $R_4'$ are hydrogen, halo of atomic weight of from 19 to 80, lower alkyl or phenyl (thus also qualifying $R_3$ and $R_4$ in compound VII in Step BBB-4, below).

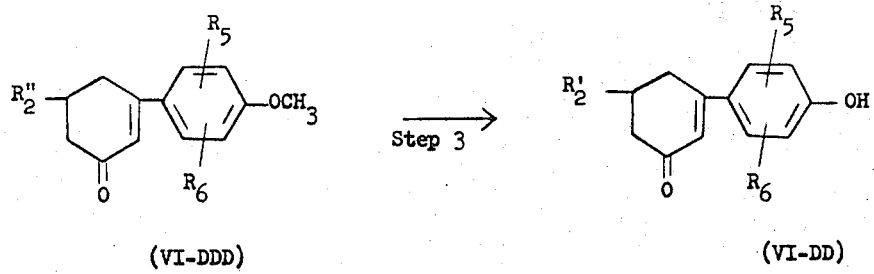

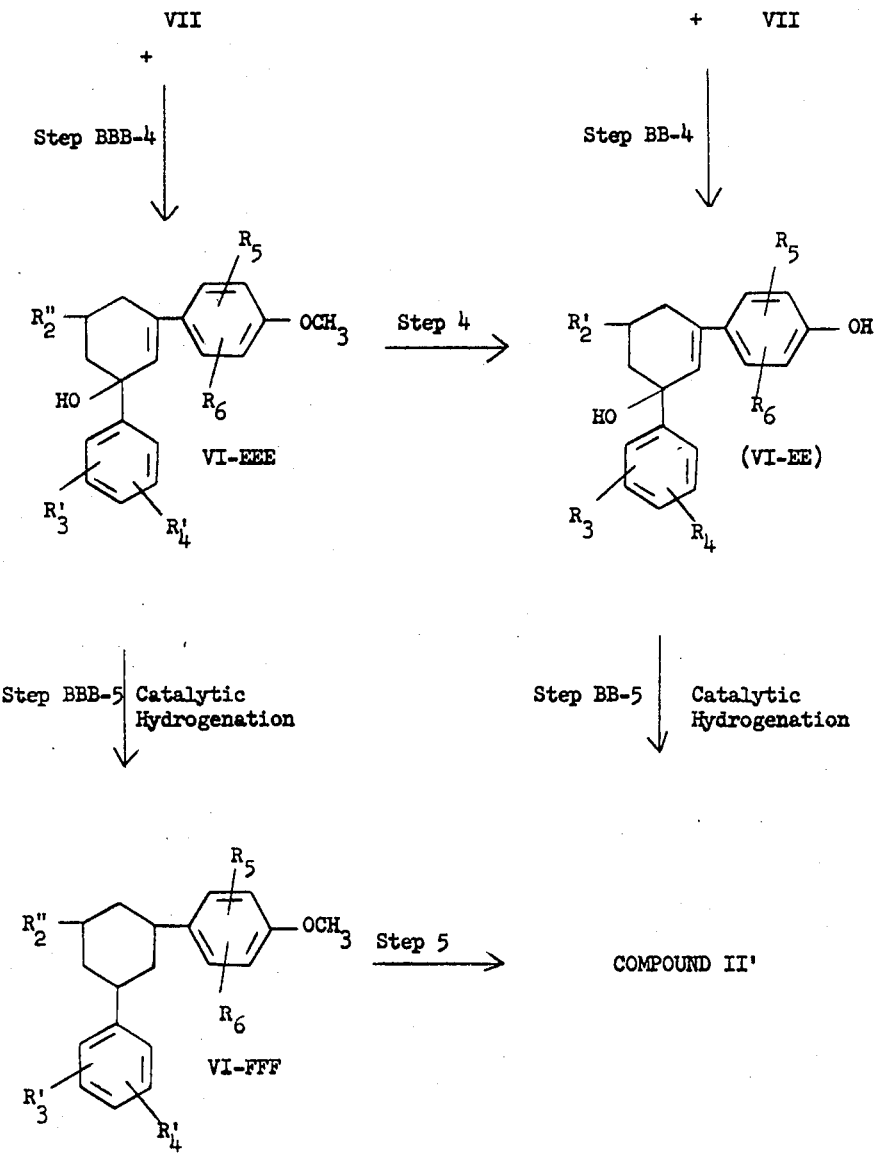

The production of compounds VI-EEE by Step BBB-4 is carried out analogously to previously described reaction of Step B.

Compounds VI-EE are produced from compounds VI-EEE by the reaction of Step 4 which is analogous to previously described Step 2.

Compounds VI-EE are also produced as illustrated by Step BB-4 which is analogous to previously described Step B.

The production of the important intermediate compounds II' from compounds VI-EE in Step BB-5 involves a catalytic hydrogenation carried out analogously to previously described Step A.

The production of compounds VI-FFF from compounds VI-EEE by Step BBB-5 involves a catalytic hydrogenation carried out analogously to Step A.

The important intermediate compounds II' are produced from compounds VI-FFF by Step 5 which is analogous to Step 2.

The important intermediate compounds of formula II'' may be prepared from compounds II' by reacting the latter analogously to Step A-1 with the appropriate halo derivative of the side chain to be introduced.

The preparation above-described in detail for obtaining the important intermediate compounds VI and II' (and thus also compounds II'') have been with reference to the preparation of said compounds VI and II' in which $R_2$ is other than hydrogen. The compounds VI-DDD and VI-DD in which $R_2'$ or $R_2''$ is hydrogen are known or can be prepared from known materials by established procedures. Thus, compounds VI in which $R_2$ is hydrogen may be readily obtained by reacting a compound VI-DD in which $R_2'$ is hydrogen with a compound III analogously to Step A-1. Compounds II' in which $R_2$ is hydrogen are readily prepared, for example, by reacting a compound VI-DDD in which $R_2''$ is hydrogen analogously to Step BBB-4 to obtain a compound VI-EEE in which $R_2''$ is hydrogen and then reacting said compound VI-EEE analogously to Step 4 to obtain the compound VI-EE in which $R_2'$ is hydrogen, followed by catalytic hydrogenation analogous to Step BB-5 to obtain a compound II' in which $R_2$ is hydrogen. Or, a compound VI-DD in which $R_2'$ is hydrogen may be reacted with a compound VII analogously to Step BB-4 to obtain a compound VI-EE in which $R_2'$ is hydrogen, followed by catalytic hydrogenation of said compound VI-EE by Step BB-5 to obtain a compound II' in which R₂ is hydrogen.

An alternate process which may be employed for preparation of compounds IA of the invention in which R₂ is hydrogen involves starting with a previously described intermediate compound VI-DDD, VI-DD or VI in which R₂' or R₂'' (as previously defined) is phenyl by reaction of such a compound in a Step 6 with a suitable reducing agent to obtain an intermediate compound of the formula XIV:

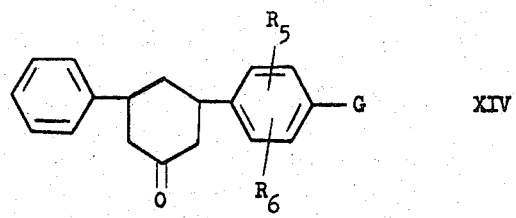

wherein R₅ and R₆ are as defined, and G is methoxy, hydroxy or the ω-aminoalkoxy moiety depending respectively on whether one proceeds from a compound VI-DDD, VI-DD or VI, said compound XIV then being subjected in a Step 6-A to carbonyl reduction in a known manner to obtain a compound XV:

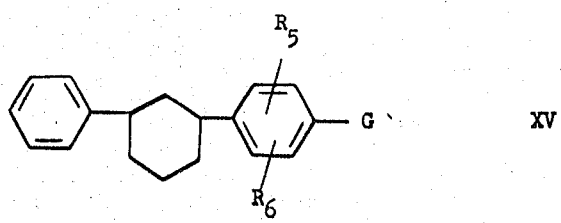

wherein G, R₅ and R₆ are as defined. The reaction of a compound VI-DDD, VI-DD or VI in Step 6 to obtain a compound XIV involves a catalytic hydrogenation of known type preferably carried out in an inert solvent at temperatures typically in the range of 10° to 50°C. Suitable catalysts for such reaction are well known and the preferred catalyst is palladium supported on carbon.

The preparation of compounds XV from compounds XIV by Step 6-A involves a reaction of the well known Wolff-Kishner type in which the compound XIV is subjected to reaction with hydrazine in the presence of a base such as an alkali metal hydroxide, preferably sodium or potassium hydroxide. The reaction may be carried out in an inert organic solvent and at temperatures in the range of 100° to 200°C., more usually 150° to 180°C. The product compound XV may be isolated from the reaction of Step 6-A by working up by conventional procedures.

It will be evident that compounds XV in which G is methoxy may be converted to the corresponding 4-hydroxy compound analogously to previously described Step 2. It will also be evident such hydroxy compounds and the compounds XV in which G is hydroxy may be converted to the compounds IA of the invention in which R₂ is hydrogen by reaction analogously to Step A-1. The compounds XV in which G is the ω-aminoalkoxy moiety represent the compounds IA of the invention in which R₂ is hydrogen.

In all of the above-described processes for producing compounds of formulae IA and IB such compounds are conveniently recovered in the form of an acid addition salt, preferably the hydrochloride, and such salts, if desired, may be converted to the free base by conventional procedures.

Also within the scope of the present invention are pharmaceutically acceptable salts not materially affecting the pharmacological effect of the compounds of formula I. Such salts include the acid addition salts, e.g., the hydrochloride, fumarate, formate, acetate, citrate, sulfonate, malonate tartrate, methane sulfonate, salicylate and hydrosulfate. The acid addition salts may be produced as desired from the corresponding free bases by conventional procedures. Conversely, the free bases may be obtained from the salts by procedures known in the art.

The compounds of structural formula I and their pharmaceutically acceptable acid addition salts are useful because they possess pharmacological activity in animals. In particular, the compounds are useful as hypolipidemic agents, as evidenced, for example, by having hypocholesteremic and hypotriglyceridemic activity, as indicated by tests on a group of white rats which are given 10–50 milligrams per kilogram of body weight per diem of the compound orally, for 6 days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H.B., Anal. Biochem. 9:393 (1964) : (Technicon method N 24a): and Kessler, G., and Lederer, H. Technicon Symposium, Mediad Inc., New York, pages 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 1 milligrams to about 50 milligrams per kilogram of animal body weight, preferably given in divided doses, 2 to 4 times a day, or in sustained release form. For most mammals the total daily dosage is from about 0.05 grams to about 0.5 grams of the compound, and the dosage forms suitable for internal use comprise from about 12.5 milligrams to about 250 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient | Weight (mg.) |
|---|---|
| 1-[4-(Diethylaminoethoxy)phenyl]-3,5-diphenyl-cyclohexane | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

4-(p-Methoxyphenyl)-2-oxo-6-phenyl-3-cyclohexene-1-carboxylic acid ethyl ester

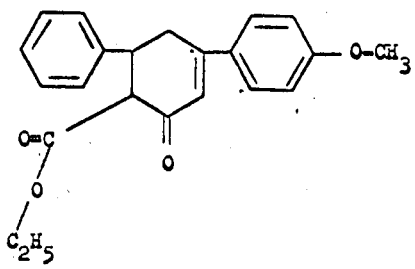

To a solution of 93 g. of 4'-methoxychalcone (a known compound) prepared by reaction of p-methoxy acetophenone and benzaldehyde dissolved in 6.5 liters absolute ethanol containing 54 g. anhydrous potassium carbonate is added 63.5 g. ethyl acetoacetate. The resulting mixture is stirred at room temperature (20°C.) for 22 hourss, evaporated in vacuo to a thick slurry which is treated with 500 ml. methylene chloride. The resulting solution is filtered and the filtrate evapaorated in vacuo to obtain a viscous oil which is taken up in 350 ml. 95 percent ethanol. The crude product is crystallized from the ethanol and recrystallization from ethanol gives 4-(p-methoxyphenyl)-2-oxo-6-phenyl-3-cyclohexene-1-carboxylic acid ethyl ester, m.p. 105.5°–107°C.

EXAMPLE 2

3-(p-Methoxyphenyl)-5-phenyl-2-cyclohexene-1-one

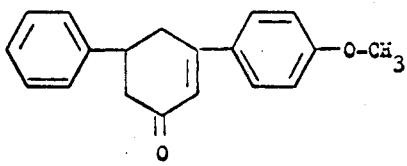

To a solution of 43 g. of 4-(p-methoxyphenyl)-2-oxo-6-phenyl-3-cyclohexene-1-carboxylic acid ethyl ester, otained from Example 1, dissolved in 860 ml. acetic acid is added 430 ml. hydrochloric acid. The resulting mixture is refluxed overnight, evaporated in vacuo to obtain a crude oil which is dissolved in 500 ml. methylene chloride. The resulting solution is washed first with 200 ml. water, then 200 ml. saturated sodium bicarbonate solution, and again with 200 ml. water. The organic phase is dried over anhydrous magnesium sulfate, evaporated in vacuo to remove solvent, and the resulting solid twice crystallized from 350 ml. ethanol to obtain yellow needles of 3-(p-methoxyphenyl)-5-pheny-2-cyclohexene-1-one, m.p. 103°–104°C.

EXAMPLE 3

3-(p-Hydroxyphenyl)-5-phenyl-2-cyclohexen-1-one

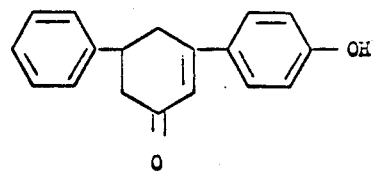

To a solution of 2.8 g. of 3-(p-methoxyphenyl)-5-phenyl-2-cyclohexen-1-one, obtained from Example 2, dissolved under reflux in 50 ml. xylene is added a total of 2.32 g. of aluminum chloride in three separate additions. The resulting mixture is refluxed for 5 hours, cooled to 0°C., and poured onto 100 ml. crushed ice. The organic phase is separated, and dried over anhydrous magnesium sulfate. Crystallization occurs on evaporation in vacuo of the organic phase and the solid obtained is recrystallized from 95 percent ethanol to obtain 3-(p-hydroxyphenyl)-5-phenyl-2-cyclohexen-1-one, m.p. 201.5°–203°C.

EXAMPLE 4

3-[4-(2-diethylaminoethoxy)phenyl]-5-phenyl-2-cyclohexen-1-one

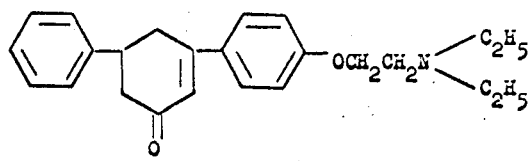

To a solution of 264 g. of 3-(p-hydroxyphenyl)-5-phenyl-2-cyclohexen-1-one, prepared as in Example 3, dissolved in 2.5 liters of toluene there is added with stirring 310 g. pulverized potassium carbonate Mixing is continued for about 1 hour and the mixture then heated to reflux. After about 2 hours at reflux, there is added 150 g. 2-diethylaminoethylchloride dissolved in 300 ml. toluene, and reflux continued overnight. The resulting mixture is cooled to 20°C. and 2.5 liters of ice water added. The organic phase is firsst washed with 3 liters water, and then with 1 liter saturated sodium chloride solution. The organic phase is dried over anhydrous sodium sulfate, and concentrated under reduced pressure (100 mm Hg.) at 65°C. to remove toluene. The resulting oil is dissolved in 500 ml. cyclohexene, filtered, and cooled to 5°C. to crystallize 3-[4-(2-diethylaminoethoxy)phenyl]-5-phenyl-2-cyclohexen-1-one, m.p. 60.5°– 61°C.

EXAMPLE 5

1-[4-(2-Diethylaminoethoxy)phenyl]-3,5-diphenylcyclohexane hydrochloride

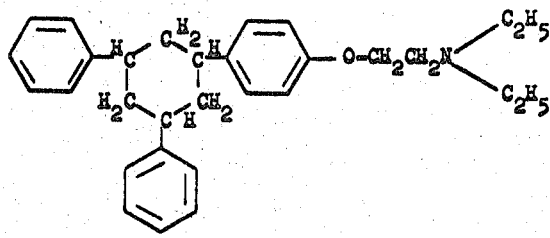

Step A:
Preparation of 3-[4-(2-diethylaminoethoxy)phenyl]-1,5-diphenyl-2-cyclohexen-1-ol

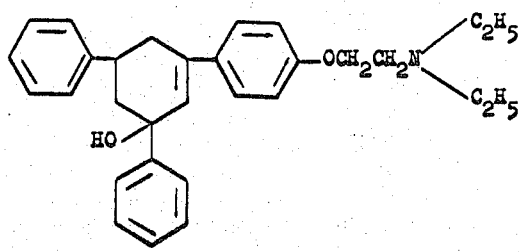

A solution of 36.5 g. of 3-[4-(2-diethylaminoethoxy)phenyl]-5-phenyl-2-cyclohexen-1-one prepared as in Example 4 dissolved in 30 ml. dry tetrahydrofuran is slowly added dropwise with stirring to a solution of about 0.2 moles of freshly prepared phenylmagnesium bromide in 100 ml of tetrahydrofuran, while maintaining the combined solutions during such addition at temperatures of about −5°C. (dry-ice-acetone bath). Thirty minutes after addition the resulting reaction mixture is allowed to warm to room temperature (20°C.) over a period of one hour. The reaction mixture is then quenched with 250 ml. of saturated ammonium chloride solution, and the resulting aqueous alkaline (pH 8 – 9) emulsion extracted three times each with 200 ml. diethyl ether. The combined ethereal extracts are first washed with 50 ml. saturated sodium chloride solution, and then extracted twice each with 200 ml. of a 10 percent solution of tartaric acid. The combined acidic extracts are back-washed twice each with 100 ml. of ether and then made basic (pH > 10) with 50 percent hydroxide. The resulting emulsion is extracted three times each with 200 ml. ether. The combined ethereal extracts are washed with 50 ml. saturated sodium chloride solution, dried over anhydrous magnesium sulfate and finally concentrated in vacuo to give a clear, bright yellow viscous oil of 3-[4-(2 -diethylaminoethoxy)phenyl]1,5-diphenyl-2-cyclohexen-1-ol.
Step B:
Preparation of 1-[4-(2-diethylaminoethoxy)phenyl]-3,5-diphenylcyclohexane hydrochloride A solution of 10 g. of 3-[4-(2-diethylaminoethoxy)phenyl]-1,5-diphenyl-2-cyclohexen-1-ol dissolved in 50 ml. glacial acetic acid is hydrogenated over 2.0 g. of catalyst composed of 5 percent palladium on charcoal at temperature of 60°C., and under pressure of 1,500 p.s.i. The hydrogenation takes about 12 hours and the amount of hydrogen introduced is approximately the stoichiometric amount.

The resulting mixture is filtered and the filtrate concentrated in vacuo. The residue is taken up in 400 ml. water, made alkaline (pH 10) with sodium hydroxide, and then extracted three times each with 200 ml. ether.

The combined ethereal extracts are washed with 150 ml. saturated sodium chloride, dried over anhydrous magnesium sulfate, and concentrated in vacuo. The resulting crude oil is taken up in 100 ml. of ether and an excess of hydrogen chloride saturated ether is added to form the hydrochloride salt which is triturated twice each with 100 ml. absolute ether. The cruce hydrochloride salt is dissolved in a minimum amount of refluxing isopropanol which upon cooling yields a white crystalline solid. On recrystallization from isopropanol, there is obtained a single spot (thin layer chromatography) crystalline solid which is 1-[4-(2-diethylaminoethoxy)phenyl]-3,5-diphenylcyclohexane hydrochloride melting in the range of 161.5°–164.5°C.

EXAMPLE 6

1-[4-(1,1-Dimethyl-2-dimethylaminoethoxy)phenyl]-3,5-diphenylcyclohexane hydrochloride.

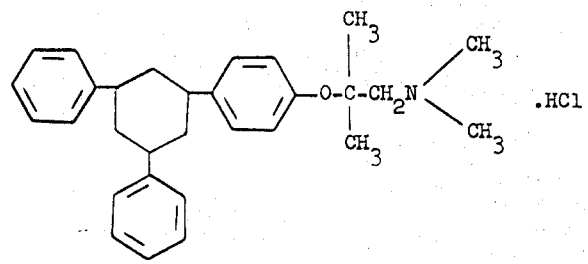

Step A:
Preparation of 2-(p-bromophenoxy)-N,N,2-trimethylpropylamine.

A suspension of 100 g. p-bromophenol dissolved in 1,000 ml. toluene containing a two-fold excess of anhydrous potassium carbonate is brought to reflux for 1.5 hours and then 200 g. of crude 2-chloro-N,N,1,1-tetramethylethylamine and the resulting mixture allowed to reflux overnight with stirring. During the reaction, the 2-chloro-N,N,1,1-tetramethylethylamine rearranges to the 2-chloro-N,N,2-trimethylpropylamine species as predicted by J. F. Kerwin et al., JACS 69, 2961 (1947). The reaction mixture is then filtered, the filtrate concentrated in vacuo, the resulting residue taken up 1,500 ml. of diether ether, washed first with 300 ml. of 2N sodium hydroxide solution, then saturated sodium chloride solution and dried over magnesium sulphate. The solution is then concentrated in vacuo to a crude oil which was purified by high vacuum distillation (0.025 mm. Hg. at 85°–91°C.) to obtain an oil of 2-(p-bromophenoxy)-N,N,2-trimethylpropylamine.

Step B:
Preparation of 1-[4-(1,1-dimethyl-2-dimethylaminoethoxy)phenyl]-3,5-diphenyl-2-cyclohexen-1-ol.

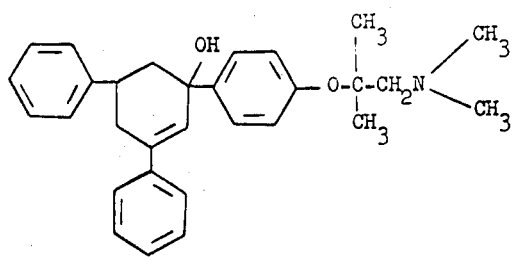

A solution of 42 g. of 2-(p-bromophenoxy)-N,N,2-trimethylpropylamine in 45 ml. tetrahydrofuran is added dropwise at room temperature to 3.71 g. of magnesium turnings in 25 ml. of tetrahydrofuran. The reaction mixture is refluxed for 1 hour with stirring. The resulting solution is cooled down to minus 5°C. and 32.5 g. of 3,5-diphenylcyclohexen-2-one-1 in 40 ml. tetrahydrofuran is added dropwise with stirring while maintaining the combined solutions at temperature of about minus 5°C. 30 minutes after addition the resulting reaction mixture is allowed to warm to room temperature over a period of 1 hour and then quenched with 250 ml. of a saturated ammonium chloride solution. The resulting alkaline emulsion is extracted three times each with 300 ml. diethyl ether and the combined ethereal extracts are first washed with 50 ml. of a saturated sodium chloride solution and then extracted twice each with 200 ml. of a 10 percent solution of tartaric acid. The combined acidic extracts are back-washed twice each with 200 ml. of diethyl ether and then made basic (pH > 10) with 50 percent sodium hydroxide. The resulting emulsion is extracted three times each with 300 ml. diether ether. The combined ethereal extracts are washed with saturated sodium chloride solution, dried over anhydrous magnesium sulphate and finally concentrated in vacuo to give a clear, bright yellow viscous oil of 1-[4-(1,1-dimethyl-2-dimethylaminoethoxy)phenyl]-3,5-diphenyl-2-cyclohexen-1-ol.

Step C:
Preparation of 1-[4-(1,1-Dimethyl-2-dimethylaminoethoxy)phenyl]-3,5-diphenylcyclohexane hydrochloride.

A solution of 22 g. of [1-(1,1-dimethyl-2-dimethylaminoethoxy)phenyl]-3,5-diphenyl-2-cyclohexen-1-ol dissolved in 300 ml. glacial acetic acid is hydrogenated over 4 g. of catalyst composed of 5 percent palladium on charcoal at temperatures between 50°–60°C. and under a pressure of 1,000 psi. The hydrogenation takes about 12 hours and the amount of hydrogen introduced was approximately the stoichiometric amount. The resulting mixture is filtered and concentrated in vacuo. The residue is taken up in water, made alkaline with sodium hydroxide and then extracted with diethyl ether. The combined ethereal extracts are washed with a saturated sodium chloride solution, dried over magnesium sulphate and concentrated in vacuo to obtain a crude oil which was purified by column chromatography employing 600 g. silicagel and chloroform as eluent to obtain 1-[4-(1,1-dimethyl-2-dimethylaminoethoxy)phenyl]-3,5-diphenylcyclohexane hydrochloride.

EXAMPLE 7

1-[4-(1,1-Dimethyl-2-dimethylaminoethoxy)phenyl]-3,5-diphenylcyclohexane N-oxide hydrochloride.

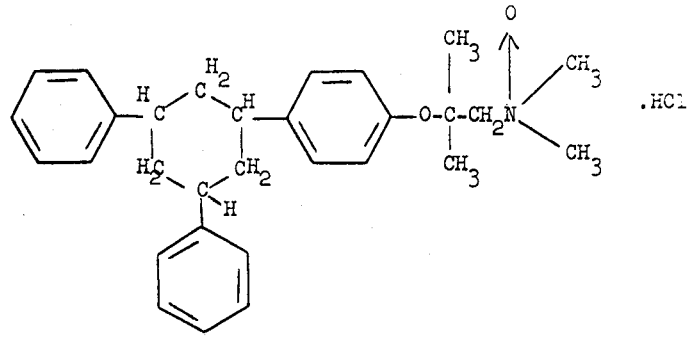

To a stirred solution of 2.7 g. of 1-[4-(1,1-dimethyl-2-dimethylaminoethoxy)phenyl]-3,5-diphenylcyclohexane(free base of product of Example 6) in 15 ml. of methanol and 15 ml. of ethanol is added about 1 ml. of 30 percent hydrogen peroxide. The resulting mixture is stirred at room temperature for three days while periodically adding more peroxide. There is then added about 0.1 g. of platinum oxide to destroy excess peroxide and the mixture is filtered and concentrated in vacuo. The residue is taken up in absolute ether to which an excess of hydrogen chloride saturated ether was added. The resulting solid is triturated with fresh ether, the ether decanted and the solid crystallized from a minimum of boiling isopropanol followed by recrystallization from isopropanol by addition of a small amount of diethyl ether to obtain 1-[4-(1,1-dimethyl-2-dimethylaminoethoxy)phenyl]-3,5-diphenylcyclohexane N-oxide hydrochloride, m.p. 158°–162°C.

EXAMPLE 8

1-[4-(2-Diethylaminoethoxy)phenyl]-3,5-diphenylcyclohexane N-oxide hydrochloride.

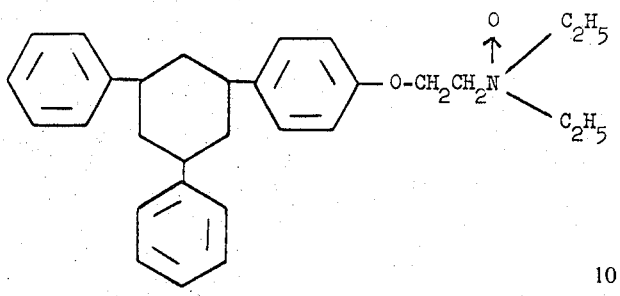

1-[4-(2-diethylaminoethoxy)phenyl]-3,5-diphenylcyclohexane hydrochloride prepared as in Example 5 is subjected to reaction with hydrogen peroxide to obtain on recrystallization from isopropanol/-diether ether the compound which is 1-[4-(2-diethylaminoethoxy)phenyl]3,5-diphenylcyclohexane N-oxide hydrochloride, m.p. 131°–134°C.

EXAMPLE 9

1-[4-(2-Diethylaminoethoxy)phenyl]3,5-diphenylcyclohexane hydrochloride.

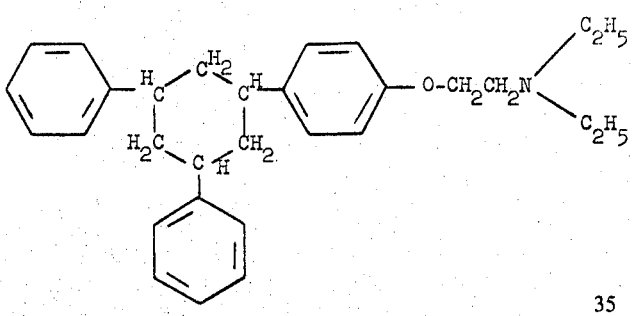

Step A:
Preparation of 1-[4-(2-diethylaminoethoxy)phenyl]-3,5-diphenylcyclohexane-1-ol.

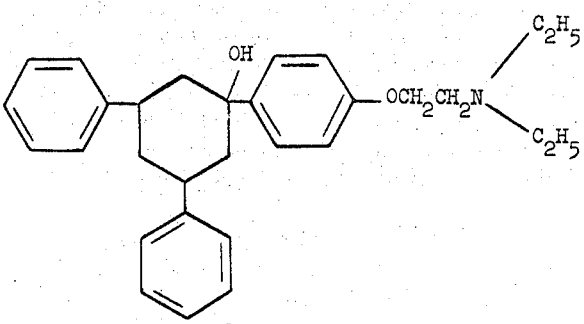

A solution of 20 g. of p-bromo-diethylaminoethoxy-benzene in 20 ml. tetrahydrofuran is added dropwise to 1.8 g. magnesium turnings in 10 ml. tetrahydrofuran. The reaction mixture is refluxed for an additional hour and then a solution of 8.6 g. 3,5-diphenylcyclohexanone in 30 ml. tetrahydrofuran is added slowly at room temperature with stirring. This reaction mixture is refluxed for 2 hours and then quenched with 250 ml. of saturated ammonium chloride solution, and the resulting aqueous alkaline (pH 8 – 9) emulsion extracted three times each with 200 ml. diethyl ether. The combined ethereal extracts are first washed with 50 ml. saturated sodium chloride solution, and then extracted twice each with 200 ml. of a 10 percent solution of tartaric acid. The combined acidic extracts are back-washed twice each with 100 ml. of ether and then made basic (pH > 10) with 50 percent sodium hydroxide. The resulting emulsion is extracted three times each with 200 ml. ether. The combined ethereal extracts are washed with 50 ml. saturated sodium chloride solution, dried over anhydrous magnesium sulfate and finally concentrated in vacuo to give a viscous oil of 1-[4-(2-diethylaminoethoxy)phenyl]3,5-diphenyl-cyclohexane-1-ol.

Step B:
Preparation of 1-[4-(2-diethylaminoethoxy)phenyl]-3,5-diphenyl-1-cyclohexene hydrochloride.

A solution of crude 1-[4-(2-diethylaminoethoxy)phenyl]-3,5-diphenyl-cyclohexane-1-ol in 60 ml. of ethanol saturated with hydrogen chloride is refluxed for 20 minutes and the resulting mixture evaporated in vacuo to remove solvent. The residue is treated by adding diethyl ether and then making alkaline (pH > 10) with 2N,NaOH. The solution is then washed with water, dried, and concentrated in vacuo to obtain an oil which is subjected to high vacuum distillation at 80°–90°C. to liberate contaminants and obtain 1-[4-(2-diethylaminoethoxy)phenyl]-3,5-diphenyl-1-cyclohexene hydrochloride, (which as a solid has a m.p. of 143°–147°C.).

Step C:
Preparation of 1-[4-(2-diethylaminoethoxy)phenyl]-3,5-diphenylcyclohexane hydrochloride.

A solution of 3 g. of 1-[4-(2-diethylaminoethoxy)phenyl]-3,5-diphenyl-1-cyclohexene dissolved in 15 ml. glacial acetic acid is hydrogenated over 3.0 g. of catalyst composed of 10 percent activated palladium on charcoal at temperature of 20°C. and atmosphere pressure. The hydrogenation takes about 12 hours and the amount of hydrogen introduced is approximately the stoichiometric amount. The resulting mixture is is filtered and the filtrate concentrated in vacuo. The residue is taken up in 100 ml. water, made alkaline (pH 10) with sodium hydroxide, and then extracted three times each with 50 ml. ether. The combined ethereal extracts are washed with 50 ml. satruated sodium chloride, dried over anhydrous magnesium sulfate, and concentrated in vacuo. The resulting crude oil is taken up in 30 ml. of ether and an excess of hydrogen chloride saturated ether is added to form the hydrochloride salt which is triturated twice each with 30 ml. absolute ether. The crude hydrochloride salt is dissolved in a minimum amount of refluxing ispropanol which upon cooling yields a white crystalline solid. On recrystallization from isopropanol, there is obtained a single spot (thin layer chromatography) crystalline solid which is 1-[4-(2-diethylaminoethoxy)phenyl]-3,5-diphenylcyclohexane hydrochloride melting at 161.5°–164.5°C.

Other representative compounds of the invention which may be readily prepared following procedures described herein are given for purposes of illustration only, as follows:

A. 1-[4-(2-diethylaminoethoxy)phenyl]-3-(2,6-dichlorophenyl)-5-(o-tolyl)-cyclohexane hydrochloride.

B. 1-[4-(2-diethylaminoethoxy)-2-methylphenyl]-3,5-diphenylcyclohexane hydrochloride.

C. 1-[4-(2-diethylaminoethoxy)phenyl]-3-(2,6-dimethoxyphenyl)-5-phenylcyclohexane hydrochloride.

D. 1-[4-(2-pyrolidimethoxy)phenyl]-3,5-diphenylcyclohexane hydrochloride.

E. 1-[4-(2-diethylaminoethoxy)phenyl]-3-phenylcyclohexane hydrochloride.

What is claimed is:

1. A compound from the group of: (A) compounds of the formula:

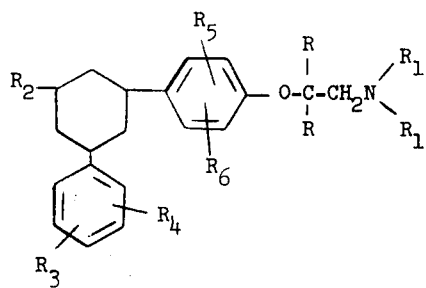

wherein each of
R is, independently, hydrogen or lower alkyl;
each of
$R_1$ is, independently, lower alkyl,
$R_2$ is hydrogen, phenyl or substituted phenyl of the formula:

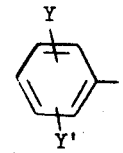

each of
Y, Y', $R_3$ and $R_4$ is, independently, hydrogen, halo of atomic weight not exceeding 80, lower alkyl or lower alkoxy, provided $R_3$ and $R_4$ are hydrogen when $R_2$ is hydrogen and providing that $R_3$, $R_4$, Y and Y' together represent no more than a total of two alkyl and alkoxy substituents, and
each of
$R_5$ and $R_6$ is, independently, hydrogen or lower alkyl;
B. N-oxides of said compounds; and
C. the pharmaceutically acceptable acid addition salts of (A) and (B), above.

2. A compound of claim 1 in which both R are hydrogen and $R_1$ is lower alkyl.

3. A compound of claim 1 in which both R are lower alkyl and $R_1$ is lower alkyl.

4. A compound of claim 1 in which $R_2$ is phenyl and $R_3$, $R_4$, $R_5$ and $R_6$ are hydrogen.

5. The compound of claim 1 which is 1-[4-(2-dimethylaminoethoxy)phenyl]-3,5-diphenylcyclohexane.

6. The compound of claim 1 which is 1-[4-(1,1-dimethyl-2-dimethylaminoethoxy)phenyl]-3,5-diphenylcyclohexane.

7. A compound which is the N-oxide of a compound of claim 1.

8. A compound which is the N-oxide of a compound of claim 4.

* * * * *